United States Patent
Lai

(10) Patent No.: US 9,612,100 B2
(45) Date of Patent: Apr. 4, 2017

(54) TOUCH EMULATOR

(71) Applicant: Wistron Corporation, New Taipei (TW)

(72) Inventor: Cheng-Chia Lai, New Taipei (TW)

(73) Assignee: Wistron Corporation, New Taipei (TW)

( * ) Notice: Subject to any disclaimer, the term of this patent is extended or adjusted under 35 U.S.C. 154(b) by 229 days.

(21) Appl. No.: 14/267,938

(22) Filed: May 2, 2014

(65) Prior Publication Data

US 2015/0193072 A1 Jul. 9, 2015

(30) Foreign Application Priority Data

Jan. 7, 2014 (TW) .............................. 103100552 A

(51) Int. Cl.
*G06F 3/044* (2006.01)
*G01B 7/00* (2006.01)
*G06F 11/22* (2006.01)

(52) U.S. Cl.
CPC .......... *G01B 7/003* (2013.01); *G06F 11/2221* (2013.01); *G06F 3/044* (2013.01)

(58) Field of Classification Search
CPC ........ G06F 3/0416; G06F 3/044; G01B 7/003
See application file for complete search history.

(56) References Cited

U.S. PATENT DOCUMENTS

| 8,195,963 B2* | 6/2012 | Zhou ......................... G06F 1/26 713/1 |
| 8,847,612 B2* | 9/2014 | Jonsson .................. G06F 3/044 324/686 |
| 9,110,543 B1* | 8/2015 | Dabell ..................... G06F 3/044 |
| 2007/0268265 A1* | 11/2007 | XiaoPing ................ G06F 3/044 345/173 |
| 2010/0079399 A1* | 4/2010 | Ma .......................... G06F 3/016 345/174 |

(Continued)

FOREIGN PATENT DOCUMENTS

| CN | 103324964 | 9/2013 |
| TW | 200917130 | 4/2009 |

(Continued)

OTHER PUBLICATIONS

"Office Action of Taiwan Counterpart Application," issued on Oct. 26, 2015, with English translation thereof, p. 1-p. 10, in which the listed references were cited.

*Primary Examiner* — Huy Q Phan
*Assistant Examiner* — Alvaro Fortich
(74) *Attorney, Agent, or Firm* — Jianq Chyun IP Office

(57) ABSTRACT

A touch emulator is provided. The touch emulator, for example, includes a substrate, a plurality of conductors, a plurality of switches, a plurality of capacitors, and a control unit. The conductors are disposed on the substrate. Each of the switches is coupled to one of the conductors, respectively. One end of each of the capacitors is respectively coupled to one of the switches, while the other end of each of the capacitors is grounded. The control unit is coupled to each of the switches. The control unit controls at least one of the switches to turn on or turn off according to a control timing sequence, so as to generate a multi-point touch input operation with a preset distribution pattern.

27 Claims, 4 Drawing Sheets

(56) References Cited

U.S. PATENT DOCUMENTS

| | | | | |
|---|---|---|---|---|
| 2010/0182272 A1* | 7/2010 | Kang | ...................... | G06F 3/044 |
| | | | | 345/174 |
| 2010/0321320 A1 | 12/2010 | Hung et al. | | |
| 2011/0037708 A1* | 2/2011 | Yang | ...................... | G06F 3/044 |
| | | | | 345/173 |
| 2011/0069034 A1* | 3/2011 | Yokota | .................... | G06F 3/044 |
| | | | | 345/174 |
| 2011/0273192 A1* | 11/2011 | Huang | .................... | G06F 3/044 |
| | | | | 324/678 |
| 2011/0273193 A1* | 11/2011 | Huang | .................... | G06F 3/044 |
| | | | | 324/678 |
| 2012/0187956 A1* | 7/2012 | Uzelac | .................. | G01R 31/28 |
| | | | | 324/537 |
| 2012/0200520 A1* | 8/2012 | Harris | .................... | G06F 3/016 |
| | | | | 345/173 |
| 2012/0256869 A1* | 10/2012 | Walsh | .................. | G06F 3/0416 |
| | | | | 345/174 |
| 2013/0069908 A1 | 3/2013 | Sung | | |
| 2013/0176277 A1* | 7/2013 | Wang | ...................... | G06F 3/044 |
| | | | | 345/174 |

FOREIGN PATENT DOCUMENTS

| | | |
|---|---|---|
| TW | 201101129 | 1/2011 |
| TW | M447545 | 2/2013 |

* cited by examiner

TOUCH EMULATOR

CROSS-REFERENCE TO RELATED APPLICATION

This application claims the priority benefit of Taiwan application serial no. 103100552, filed on Jan. 7, 2014. The entirety of the above-mentioned patent application is hereby incorporated by reference herein and made a part of this specification.

BACKGROUND OF THE INVENTION

1. Field of the Invention

The invention relates to a touch emulator and more particularly a touch emulator that may be applied on a capacitive touch panel and may simulate a touch input by a finger or a stylus.

2. Description of Related Art

Modern small consumer electronic devices, such as smart phones or tablet computers, are usually operated by means of touch panels or touch displays instead of physical buttons. The touch display includes a display and a touch panel that are stacked together, and the touch panel has become an important component in the consumer electronic device. There are many types of touch panels, one of which is the widely used capacitive touch panel. The capacitive touch panel is generally operated by means of fingers or conductive styluses which perform the touch input. The most common touch input is to touch a point in a single click, even though there may be many points to be clicked. The common capacitive touch panel capable of performing the multi-point touch function usually does not require precise multi-touch positions on the interface; instead, the capacitive touch panel may make proper determination based on the gestures. For example, if it is intended to rotate or move photographs, the capacitive touch panel merely requires two fingers that are simultaneously located within the borders of the photographs; in another example, while a user intends to switch between different applications, the capacitive touch panel merely requires multiple fingers that simultaneously touch the touch panel. Since the operation of the conventional multi-point touch panel requires single touch at different times or depends on gestures rather than precise location positioning and input, the applicability of the capacitive touch panel is limited.

SUMMARY

An exemplary embodiment of the invention provides a touch emulator that produces at least one capacitance effect to simulate the touch input on a capacitive panel by tools, such as fingers or styluses.

In an exemplary embodiment of the invention, a touch emulator that comprises a substrate, a plurality of conductors, a plurality of switches, a plurality of capacitors, and a control unit is provided. The conductors are disposed on the substrate. Each of the switches is coupled to one of the conductors, respectively. One end of each of the capacitors is respectively coupled to one of the switches, while the other end of each of the capacitors is grounded. The control unit is coupled to each of the switches. The control unit controls at least one of the switches to turn on or turn off according to a control timing sequence to generate a multi-point touch input operation with a preset distribution pattern.

In another exemplary embodiment of the invention, a touch emulator that includes a substrate, a plurality of conductors, a plurality of capacitors, and a control unit is provided. The conductors are disposed on the substrate. Each of the switches is coupled to one of the conductors, respectively. One end of each of the plurality of capacitors is respectively coupled to one of the conductors, while the other end of each of the capacitors is grounded. The control unit is coupled to each conductor. The control unit controls at least one variable capacitance value of the capacitors to vary according to a control timing sequence to generate a multi-point touch input operation with a preset distribution pattern.

The touch emulator may include a capacitor or a plurality of capacitors to simulate the capacitance obtained from the touch input by the tools, such as fingers or styluses, so as to precisely sense the position of the multi-touch input or even sense the input at one time or sequentially sense the input within a very short time to improve the efficiency of input and authentication. Hence, the touch emulator may be applied for entry access control, identity management systems, or automatic tests on the touch panel.

DETAILED DESCRIPTION OF DISCLOSED EMBODIMENTS

Figure 1:
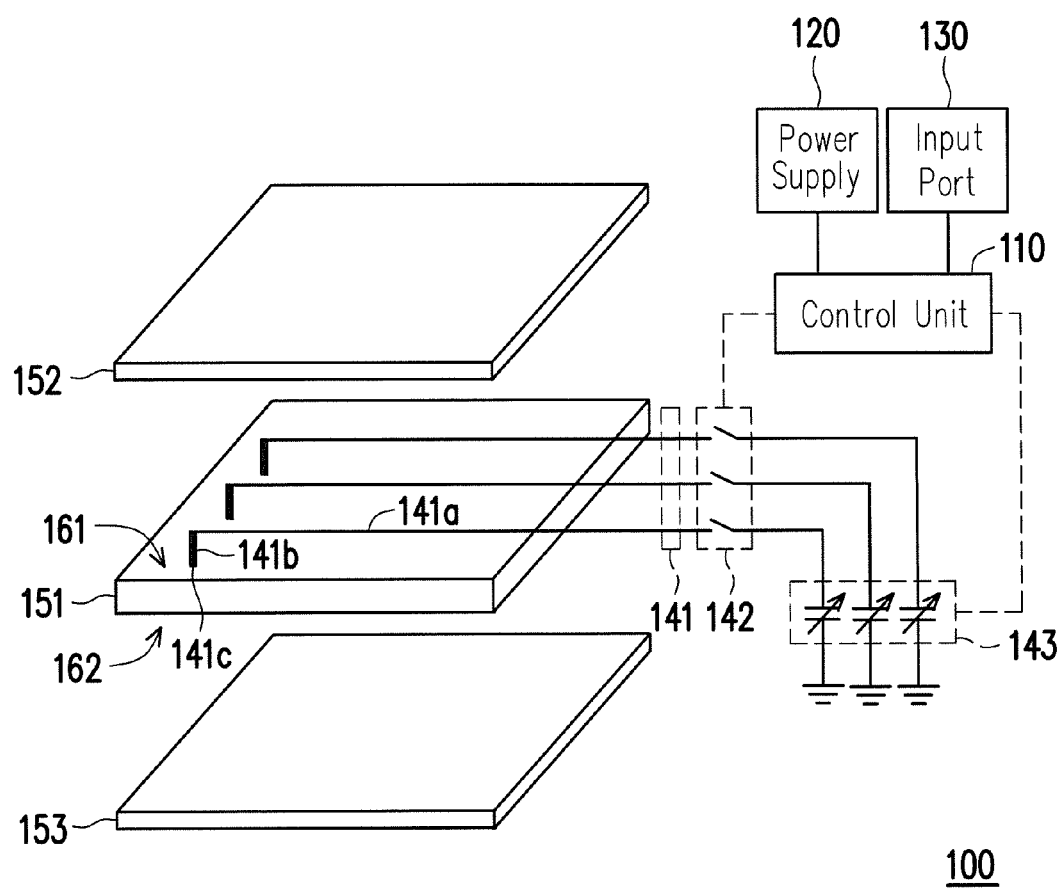
FIG. 1 is a schematic diagram illustrating a touch emulator according to an exemplary embodiment of the invention.

FIG. 1 is a schematic diagram illustrating a touch emulator according to an exemplary embodiment of the invention. A touch emulator 100 includes an insulating substrate 151 and the two insulating layers 152 and 153, three conductors 141, three switches 142, three capacitors 143, a control unit 110, a power supply 120, and an input port 130. Each capacitor 143 is a variable capacitor. Each switch 142 is coupled to one conductor 141. One end of each capacitor 143 is coupled to one of the switches 142, and the other end is grounded. The control unit 110 is coupled to each switch 142 and each capacitor 143. The control unit 110 is also coupled to the power supply 120 and the input port 130.

FIG. 1 shows that each conductor 141 includes a connecting portion 141a and a sensing portion 141b that are connected to each other. The connecting portion 141a is coupled to one of the switches 142 and disposed on an upper surface 161 of the substrate 151. The sensing portion 141b penetrates the substrate 161 from the upper surface 161 of the substrate 151 to the lower surface 162 of the substrate 151, and the sensing point 141c is exposed, or the sensing portion 141b is inserted into the substrate 151, and the sensing point 141c is buried. The insulating layers 152 and 153 are respectively disposed above and below the substrate 151. To clearly illustrate the arrangement of the conductors 141 and the substrate 151 in FIG. 1, the substrate 151 and the insulating layers 152 and 153 are drawn separately. The substrate 151 is substantially closely integrated with the two insulating layers 152 and 153 to constitute a card or a tablet and may be placed on a capacitive touch panel to emulate a touch input operation that can be sensed by the capacitive touch panel. The insulating layers 152 and 153 protect the conductors 141 from being exposed or scratched. If the protection of the conductors 141 is not needed under certain circumstances, one or both of the insulating layers 152 and 153 may be omitted.

The switches 142, the capacitors 143, the control unit 110, the power supply 120, and the input port 130 shown on the right side in FIG. 1 may be located on the substrate 151 or even on the insulating layer 152 or the insulating layer 153, so that the touch emulator 100 may be manufactured in form of a card or a tablet which is easy to carry. Alternatively, the switches 142, the capacitors 143, the control unit 110, the power supply 120, and the input port 130 may be manufactured in form of an independent device, and the resultant touch emulator 100 looks like an independent device connected to a card or a tablet.

The power supply 120 may provide the power required for the operation of the control unit 110. The control unit 110 may receive the control timing sequence via the input port 130. Alternatively, the control timing sequence may be directly stored into the control unit 110, so as to omit the input port 130. The control unit 110 may control at least one of the switches 142 to turn on or turn off according to the control timing sequence. The control unit 110 may also control at least one variable capacitance value of the capacitors 143 to vary according to the control timing sequence. Whenever one of the switches 142 is turned on, the combined conductor 141 and capacitor 143 corresponding to the switch 142 may be deemed equivalent to an input tool of the capacitive touch panel, such as a finger or a stylus. The different capacitance values enable the touch panel to sense the different touch pressures in response to the varying areas touched by fingers or the like. Therefore, the touch emulator 100 may generate the touch input at different positions and with different touch pressures, so as to allow the capacitive touch panel in contact with the card or the tablet to enable the authentication.

If the above capacitive touch panel is a part of the touch display, the conductors 141, the substrate 151, and the two insulating layers 152 and 153 may all be made of a highly transparent material for the user to watch the displayed images on the touch display. For example, each of the conductors 141 may be a conductive wire made of a transparent material or a highly transparent material, such as indium tin oxide, silver nanowire, carbon nanotube, or grapheme materials. The substrate 151 and the two insulating layers 152 and 153 may be general insulating transparent glass or plastic panels. If the conductors 141, the substrate 151, and the two insulating layers 152, 153 need not be transparent, each conductor 141 may be made of general conductive materials, such as copper or silver wire, while the substrate 151 and the two insulating layers 152 and 153 may be made of general insulating materials, such as acrylic or plastic.

The power supply 120 may be an induction coil. The power required for the operation of the control unit 110 may be provided by the induction coil through induction according to a magnetic field generated by approaching the capacitive touch panel. Therefore, the entire touch emulator 100 may be manufactured in form of a portable device, such as a card or a tablet without the built-in battery. Alternatively, the induction coil may be replaced by a battery; as a result, the control unit 110 may operate as normal without the magnetic field generated by approaching the capacitive touch panel. The battery may be built into the touch emulator 100 or an external battery. Besides, the battery may be a rechargeable battery or a disposable battery. Alternatively, the built-in power supply 120 may be omitted, and the control unit 110 may be electrically connected to an external power supply, so as to provide the power required for the operation of the control unit 110.

Figure 2:
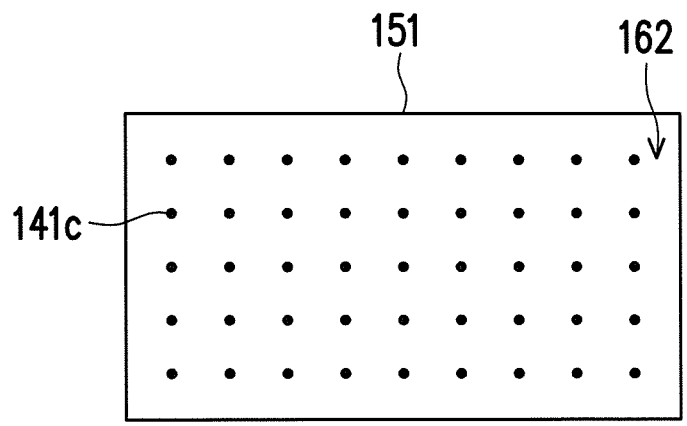
FIG. 2 is a schematic diagram illustrating an insulating layer and the conductors according to an exemplary embodiment of the invention.

The touch emulator may or may not include three conductors, three switches, and three capacitors; specifically, in other embodiments, the touch emulator may include N conductors, N switches, and N capacitors, where N may be any positive integer. For instance, in an exemplary embodiment shown in FIG. 2, 45 sensing points 141*c* may be distributed onto the lower surface 162 of the substrate 151 when N=45, and each dot in FIG. 2 is a sensing point 141*c* of the conductor 141. For simplicity, only one sensing point 141*c* is depicted in FIG. 2.

As discussed above, the control unit 110 may control each of the switches 142 to turn on and turn off and control the variable capacitance value of each capacitor 143 to vary according to the control timing sequence. Whenever any of the switches 142 is turned on, the capacitive touch panel senses that a touch point appears; whenever any of the switches 142 is turned off, the capacitive touch panel senses that a touch point disappears. The control unit 110 may control a switch corresponding to a conductor to turn on first and then turn off, and the control unit 110 may further control an adjacent switch or another switch corresponding to another conductor to turn on. The process may be repeated, so that the touch panel may sense a moving touch point. In other embodiments, the control unit 110 may control the switches corresponding to the conductors at a plurality of different positions to simultaneously turn on and the control unit 110 may control all switches to simultaneously turn off and then again control the switches corresponding to the conductors at a plurality of different positions to simultaneously turn on. Therefore, the capacitive touch panel may sense the continuous touch inputs with the distribution pattern of a plurality of different touch points. The control unit 110 may change the capacitance value of the capacitor 143, so that the capacitance touch panel senses the change to the touch pressure Thus, the touch emulator 100 enables the touch panel to sense the moving gestures of the input tools, such as the fingers or styluses. The control unit 110 may also simultaneously control a plurality of sets of the switches and the capacitors, so that the touch panel may sense changes to positions of the touch points, pressures of the touch points, or both. The touch emulator 100 may generate a simulated, pre-set touch operation pattern of a finger or a stylus, and thereby the entry access systems and clearance management systems are allowed to perform authentication. The touch operation generated by the touch emulator 100 may be applied for performing the automatic touch panel tests, which include pressure tests and general operation tests. For example, there are 45 sensing points 141*c* in the touch emulator 100, as shown in FIG. 2. The upper left sensing point is numbered as 01, the numbers increase toward the right and then increase from left to right at the next row until the lower right lower point is numbered as 45. At this time, the correct touch operation pattern may be pre-set to include seven sensing points 08, 23, 29, 31, 36, 39, and 40. Furthermore, the touch operation sequence may be configured and controlled to be the sequence 36→08→40→31→39→23→29, so as to generate a series of leap inputs of touch points and thereby generate the inputs similar to password inputs or test point inputs. After the capacitive touch panel receives the touch input at the same coordinate position and in the same order, the capacitive touch panel can then perform specific pre-set functions. Alternatively, by applying the above method, the capacitive touch panel may configure and control the seven sensing points simultaneously, so as to generate the input similar to a one-time password input or test point input. The capacitive touch panel must receive all touch inputs at the pre-set coordinate positions and then perform the specific present function.

Figure 3:
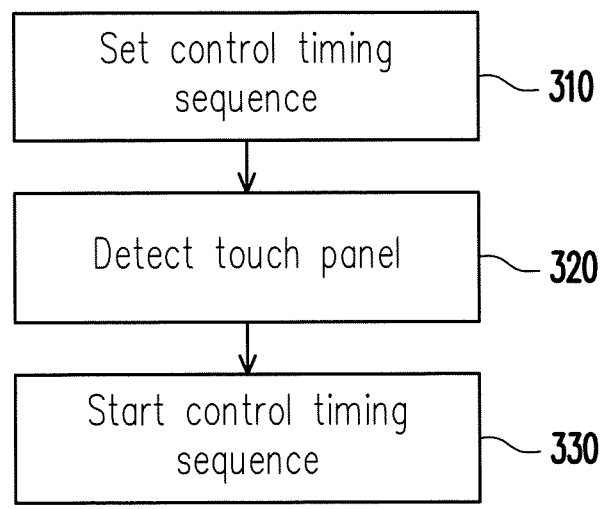
FIG. 3 is a flow chart of an operation of a touch emulator according to an exemplary embodiment of the invention.

FIG. 3 is a flow chart of an operation of the touch emulator 100 according to an exemplary embodiment of the invention. In step 310, the control timing sequence is set. The control unit 110 may set and store the control timing sequence of the switches 142 and the capacitors 143 by receiving the control timing sequence from the outside through the input port 130. Alternatively the control timing sequence may be preset and stored in the control unit 110. In step 320, the control unit 110 may, through the power induced by electromagnetic induction of the induction coil of the power supply 120 or a current obtained from the capacitive touch panel through at least one of the capacitors 143, detect the approach of the capacitive touch panel. Then, in step 330, the control unit 110 starts the control timing sequence. The control timing sequence may include the turn-on time and/or the turn-off time of at least one switch 142. The control timing sequence may also include at least one time function. Each time function defines how to change the capacitance value of a capacitor 143 along with time. Therefore, the control unit 110 may control the switches 142 and the capacitors 143 based on the control timing sequence to generate a multi-point touch input operation with a preset distribution pattern. In another embodiment, the step 320 may not be needed, while a design of a manual switch for manually turning on or turning off the control timing sequence may be required.

Figure 4:
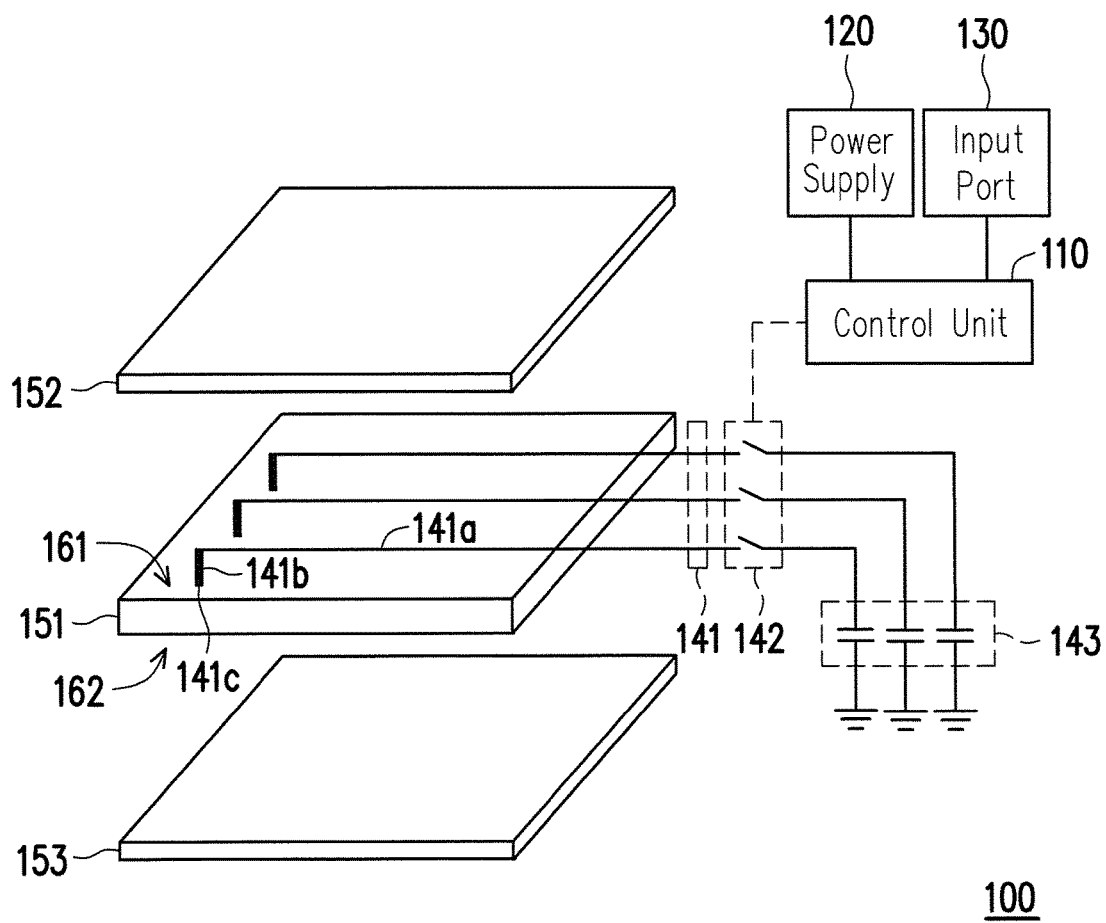
FIG. 4 is a schematic diagram illustrating a touch emulator according to another exemplary embodiment of the invention.

FIG. 4 is a schematic diagram illustrating the touch emulator 100 according to another exemplary embodiment of the invention. In this embodiment, each capacitor 143 is not a variable capacitor but a noimal capacitor whose capacitance value is fixed. Therefore, the capacitors 143 are controlled by the control unit 110. The control unit 110 may control at least one of the switches 142 to turn on or turn off according to a control timing sequence.

Figure 5:
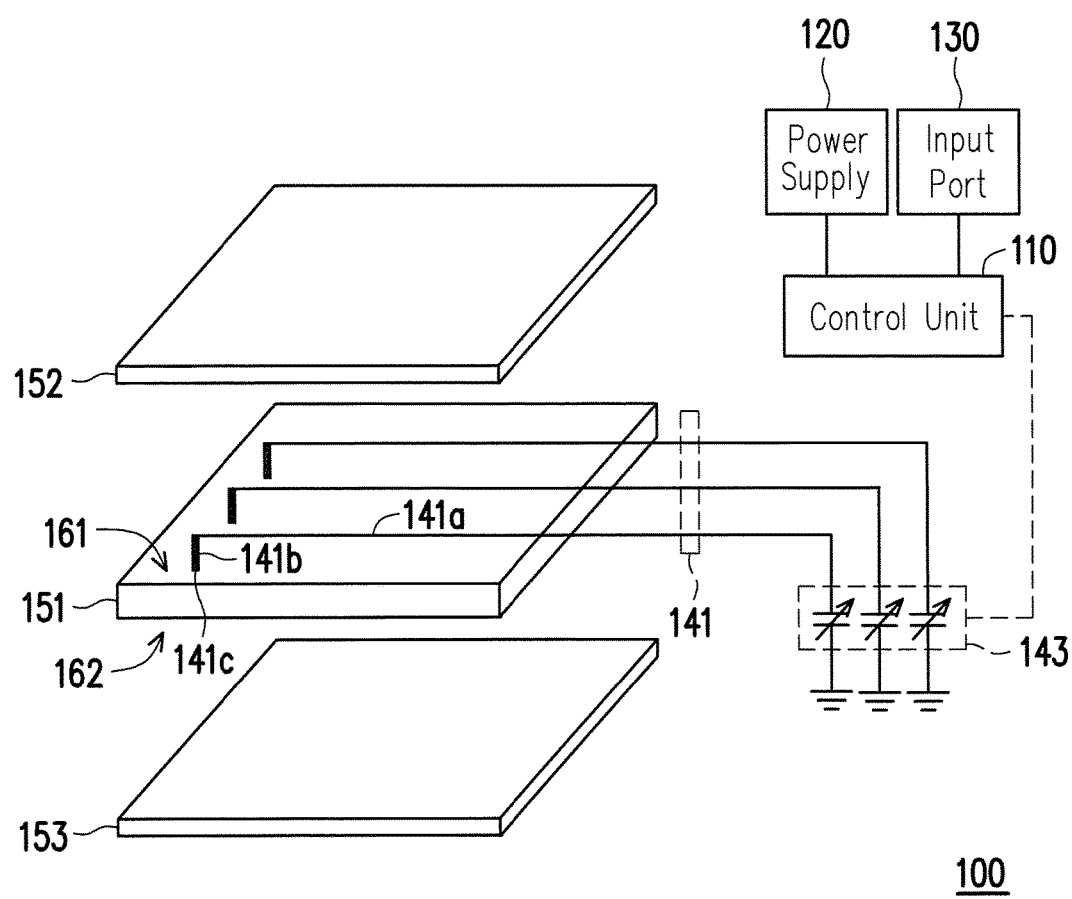
FIG. 5 is a schematic diagram illustrating a touch emulator according to another exemplary embodiment of the invention.

FIG. 5 is a schematic diagram illustrating the touch emulator 100 according to another exemplary embodiment of the invention. The touch emulator 100 provided in this embodiment does not include the switches 142. Each capacitor 143 is connected directly to one corresponding conductor 141. The control unit 110 may control at least one variable capacitance value of the capacitors 143 to vary according to the control timing sequence.

To sum up, in an exemplary embodiment of the invention, the input on the capacitive touch panel by the tools including fingers or styluses is simulated, and so are the changes to the touch position and pressure, such that the touch emulator described herein may be used for authentication in entry access systems and clearance management systems and for pressure tests and general operation tests on the touch panel, so as to replace the mechanical stress testing equipment of the touch panel. Besides, in an exemplary embodiment of the invention, the touch emulator may indirectly touch the capacitive touch panel, so that the capacitive touch panel is less likely to be worn out. Furthermore, because of the electronic control, the speed at which the touch panel test is performed may be much higher than the speed of the mechanical testing equipment, so as to improve the test efficiency. In addition, in the aforementioned embodiments, the touch emulator is applied in the capacitive touch panel, for example, while the touch emulator may also be applicable to an electromagnetic touch panel according to another embodiment.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch emulator comprising:
   a substrate;
   a plurality of conductors disposed on the substrate;
   a plurality of switches, each of the plurality of switches being coupled to one of the plurality of conductors, respectively;
   a plurality of capacitors, one end of each of the plurality of capacitors being respectively coupled to one of the plurality of switches while the other end of each of the plurality of capacitors being grounded; and
   a control unit coupled to each of the plurality of switches, the control unit detecting an approach of a touch panel and then starting a control timing sequence to control at least one of the plurality of switches to turn on or turn off to emulate a multi-point touch input operation with a preset distribution pattern.

2. The touch emulator of claim 1, wherein each of the plurality of capacitors is a variable capacitor, the control unit is further coupled to each of the capacitors and controls at least one variable capacitance value of the capacitors to vary according to the control timing sequence.

3. The touch emulator of claim 1, further comprising:
   an input port coupled to the control unit, wherein the control unit receives the control timing sequence from outside through the input port.

4. The touch emulator of claim 1, wherein the control timing sequence is stored in the control unit.

5. The touch emulator of claim 1, wherein each of the plurality of conductors includes a connecting portion and a sensing portion, the connecting portion is coupled to a said switch and disposed on a first surface of the substrate, and the sensing portion penetrates the substrate such that a sensing point of the sensing portion is at least close to a second surface of the substrate corresponding to the first surface.

6. The touch emulator of claim 5, wherein the sensing portion penetrates the second surface, and the sensing point is exposed to an outside of the second surface.

7. The touch emulator of claim 5, further comprising:
   a first insulating layer disposed on the first surface of the substrate; and
   a second insulating layer disposed on the second surface of the substrate.

8. The touch emulator of claim 7, wherein the conductors, the substrate, the first insulating layer, and the second insulating layer are all made of a highly transparent material.

9. The touch emulator of claim 1, further comprising:
   an induction coil coupled to the control unit, the induction coil inducing an external magnetic field to generate power required for an operation of the control unit.

10. The touch emulator of claim 9, wherein the control unit detects an approach of a touch panel and starts the control timing sequence through the power output by the induction coil or a current obtained from a sensing action of at least one of the capacitors.

11. The touch emulator of claim 1, wherein the control timing sequence is turned on or turned off by a manual switch.

12. The touch emulator of claim 1, wherein power required for an operation of the control unit is provided by an internal battery or an external power supply.

13. The touch emulator of claim 1, wherein the control timing sequence is applied to select and sequentially control some of the plurality of switches to turn on or turn off according to a preset sequence to generate the multi-point touch input operation.

14. The touch emulator of claim 1, wherein the control timing sequence is applied to select and control some of the plurality of switches to turn on or turn off simultaneously to generate the multi-point touch input operation.

15. The touch emulator of claim 1, wherein the touch panel is a capacitive touch panel.

16. A touch emulator comprising:
  a substrate;
  a plurality of conductors disposed on the substrate;
  a plurality of capacitors, one end of each of the plurality of capacitors being respectively coupled to one of the plurality of conductors while the other end of each of the plurality of capacitors being grounded; and
  a control unit coupled to each of the plurality of capacitors, the control unit detecting an approach of a touch panel and then starting a control timing sequence to control at least one variable capacitance value of the plurality of capacitors to vary to emulate a multi-point touch input operation with a preset distribution pattern.

17. The touch emulator of claim 16, further comprising:
  an input port coupled to the control unit, wherein the control unit receives the control timing sequence from outside through the input port.

18. The touch emulator of claim 16, wherein the control timing sequence is stored in the control unit.

19. The touch emulator of claim 16, wherein each of the plurality of conductors includes a connecting portion and a sensing portion, the connecting portion is coupled to a said capacitor and disposed on a first surface of the substrate, the sensing portion penetrates the substrate such that a sensing point of the sensing portion is at least close to a second surface of the substrate corresponding to the first surface.

20. The touch emulator of claim 19, wherein the sensing portion penetrates the second surface, and the sensing point is exposed to an outside of the second surface.

21. The touch emulator of claim 19, further comprising:
  a first insulating layer disposed on the first surface of the substrate; and
  a second insulating layer disposed on the second surface of the substrate.

22. The touch emulator of claim 21, wherein the conductors, the substrate, the first insulating layer, and the second insulating layer are all made of a highly transparent material.

23. The touch emulator of claim 16, further comprising:
  an induction coil coupled to the control unit, the induction coil inducing an external magnetic field to generate power required for an operation of the control unit.

24. The touch emulator of claim 23, wherein the control unit detects an approach of a touch panel and starts the control timing sequence through the power output by the induction coil or a current obtained from a sensing action of at least one of the capacitors.

25. The touch emulator of claim 16, wherein the control timing sequence is turned on or turned off by a manual switch.

26. The touch emulator of claim 16, wherein power required for an operation of the control unit is provided by an internal battery or an external power supply.

27. The touch emulator of claim 16, wherein the touch panel is a capacitive touch panel.

* * * * *